US010120412B2

(12) United States Patent
Chen et al.

(10) Patent No.: US 10,120,412 B2
(45) Date of Patent: Nov. 6, 2018

(54) ELECTRONIC DEVICE

(71) Applicant: ASUSTeK COMPUTER INC., Taipei (TW)

(72) Inventors: Yung-Hsiang Chen, Taipei (TW); Li-Wei Hung, Taipei (TW)

(73) Assignee: ASUSTeK COMPUTER INC., Taipei (TW)

( * ) Notice: Subject to any disclaimer, the term of this patent is extended or adjusted under 35 U.S.C. 154(b) by 0 days.

(21) Appl. No.: 15/678,123

(22) Filed: Aug. 16, 2017

(65) Prior Publication Data
US 2018/0059719 A1 Mar. 1, 2018

(30) Foreign Application Priority Data
Aug. 23, 2016 (CN) .......................... 2016 1 0705550

(51) Int. Cl.
G06F 1/16 (2006.01)

(52) U.S. Cl.
CPC ............ G06F 1/1616 (2013.01); G06F 1/166 (2013.01); G06F 1/1637 (2013.01); G06F 1/1681 (2013.01); G06F 1/1683 (2013.01)

(58) Field of Classification Search
CPC ................................ G06F 1/166; G06F 1/1683
USPC .................................................... 361/679.45
See application file for complete search history.

(56) References Cited

U.S. PATENT DOCUMENTS

| | | | | |
|---|---|---|---|---|
| 5,251,102 A * | 10/1993 | Kimble | ................. | G06F 1/1616 361/679.09 |
| 6,154,359 A * | 11/2000 | Kamikakai | ........... | G06F 1/1618 16/342 |
| 7,926,781 B2 * | 4/2011 | Wang | .................... | G06F 1/1616 248/351 |
| 8,891,231 B2 | 11/2014 | Okuley et al. | | |
| 8,897,005 B2 | 11/2014 | Huang et al. | | |
| 8,934,219 B2 * | 1/2015 | Gartrell | ................. | G06F 1/1616 248/229.22 |
| 8,937,806 B2 * | 1/2015 | Senatori | ............. | H05K 7/20127 165/104.33 |
| 9,152,169 B2 | 10/2015 | Liang et al. | | |
| 2002/0012228 A1 * | 1/2002 | Ozaki | ..................... | G06F 1/203 361/679.48 |
| 2003/0157389 A1 * | 8/2003 | Kornmayer | .......... | G06F 1/1616 361/679.55 |
| 2004/0246667 A1 * | 12/2004 | Maskatia | .............. | G06F 1/1618 361/679.28 |
| 2004/0264118 A1 * | 12/2004 | Karidis | ................. | G06F 1/1616 361/679.55 |

(Continued)

FOREIGN PATENT DOCUMENTS

| | | |
|---|---|---|
| EP | 2911029 A1 | 8/2015 |
| TW | 201320865 A | 5/2013 |

(Continued)

*Primary Examiner* — Adrian S Wilson
(74) *Attorney, Agent, or Firm* — CKC & Partners Co., Ltd.

(57) ABSTRACT

An electronic device is provided. The electronic device comprises a first body structure; a connecting portion; and a second body structure connected to the first body structure via the connecting portion. The second body structure includes a cover portion, and an end portion connected to an edge of the cover portion. A thickness of the end portion is larger than the thickness of the cover portion. An I/O port is disposed at a side wall of the end portion.

9 Claims, 8 Drawing Sheets

(56) References Cited

U.S. PATENT DOCUMENTS

| | | | | |
|---|---|---|---|---|
| 2008/0304217 A1* | 12/2008 | Lai | G06F 1/1616 | 361/679.26 |
| 2010/0127137 A1* | 5/2010 | Wang | G06F 1/1616 | 248/188.6 |
| 2011/0075352 A1* | 3/2011 | Tye | G06F 1/203 | 361/679.46 |
| 2012/0162871 A1* | 6/2012 | Tseng | G06F 1/1635 | 361/679.01 |
| 2013/0170124 A1* | 7/2013 | Pan | H05K 5/0226 | 361/679.08 |
| 2013/0201617 A1* | 8/2013 | Tsai | G06F 1/1616 | 361/679.4 |
| 2013/0314859 A1* | 11/2013 | Huang | H05K 7/02 | 361/679.01 |
| 2014/0029187 A1* | 1/2014 | Okuley | G06F 1/1616 | 361/679.09 |
| 2014/0185233 A1* | 7/2014 | MacDonald | G06F 1/1681 | 361/679.55 |
| 2014/0273590 A1* | 9/2014 | Sharma | G06F 1/1669 | 439/350 |
| 2014/0355190 A1* | 12/2014 | Yeh | G06F 1/1669 | 361/679.17 |
| 2015/0016057 A1* | 1/2015 | Fu | G06F 1/166 | 361/679.55 |
| 2015/0227168 A1* | 8/2015 | Nakamura | G06F 1/1616 | 361/679.55 |
| 2015/0370289 A1* | 12/2015 | Ho | G06F 1/1616 | 361/679.55 |

FOREIGN PATENT DOCUMENTS

| | | |
|---|---|---|
| TW | 201418946 A | 5/2014 |
| TW | 201423332 A | 6/2014 |
| TW | 201514658 A | 4/2015 |

* cited by examiner

ELECTRONIC DEVICE

CROSS-REFERENCE TO RELATED APPLICATION

This application claims the priority benefit of Chinese application serial No. 201610705550.2, filed on Aug. 23, 2016. The entirety of the above-mentioned patent application is hereby incorporated by references herein and made a part of specification.

BACKGROUND OF THE INVENTION

Field of the Invention

The disclosure relates to an electronic device and, more specifically, to an electronic device with two body structures that are rotatable to be opened or closed relative to each other.

Description of the Related Art

With the rapid development of information industry, portable notebook computers are gradually developed to replace desktop computers. The portable notebooks are widely used and have a high market share.

Generally, the notebook computer has a display screen and a host that can be opened or closed relative to each other. Conventionally, an I/O port (such as a USB port) is disposed at the host of the notebook computer, which increase the thickness of the host.

On the other hand, with the requirement of the portability, notebook computers become light, small, and thin. However, if a keyboard of the notebook computer becomes thinner, an operation surface of the keyboard is too lower and unergonomic for a user to operate.

BRIEF SUMMARY OF THE INVENTION

According to an aspect of the disclosure, an electronic device is provided. The electronic device comprises: a first body structure, a connecting portion, and a second body structure connected to the first body structure via the connecting portion. The second body structure includes a cover portion, and an end portion connected to an edge of the cover portion. A thickness of the end portion is larger than the thickness of the cover portion. An I/O port is disposed at a side wall of the end portion. When the cover portion covers a top surface of the first body structure, the end portion covers a rear side wall of the first body structure. When the second body structure rotates relative to the first body structure to expose the rear side wall of the first body structure, at least part of the end portion is located below a bottom surface of the first body structure.

In sum, in embodiments of the electronic device, the end portion of the second body structure can cover the rear side wall of first body structure. The I/O port is configured at the side wall of the end portion. Therefore, the thickness of the first body structure and the thickness of the cover portion (which can covers the first body structure) of the second body structure are not limited by the size of the I/O port. Thus, the first body structure and the cover portion of the second body structure can be designed to be thinner. In the embodiments, when the first body structure rotates to be opened relative to the second body structure, at least part of the end portion is located below the bottom surface of the first body structure. At the time, the end portion serves as a support to raise the first body structure. Thus, the operation surface of the first body structure has an ergonomic angle for the user to operate.

BRIEF DESCRIPTION OF THE DRAWINGS

These and other features, aspects and advantages of the disclosure will become better understood with regard to the following embodiments and accompanying drawings.

DETAILED DESCRIPTION OF THE EMBODIMENTS

Multiple embodiments are described below accompanying with the figures. For clarity, details in practice will also be described hereinafter. However, it should be understand that the details in practice are not used for limiting the disclosure. In other words, in some of the embodiments, the details in practical are not essential. Additionally, for concise illustration, some commonly-used components or structures in the art are simplified in the figures.

Figure 1:
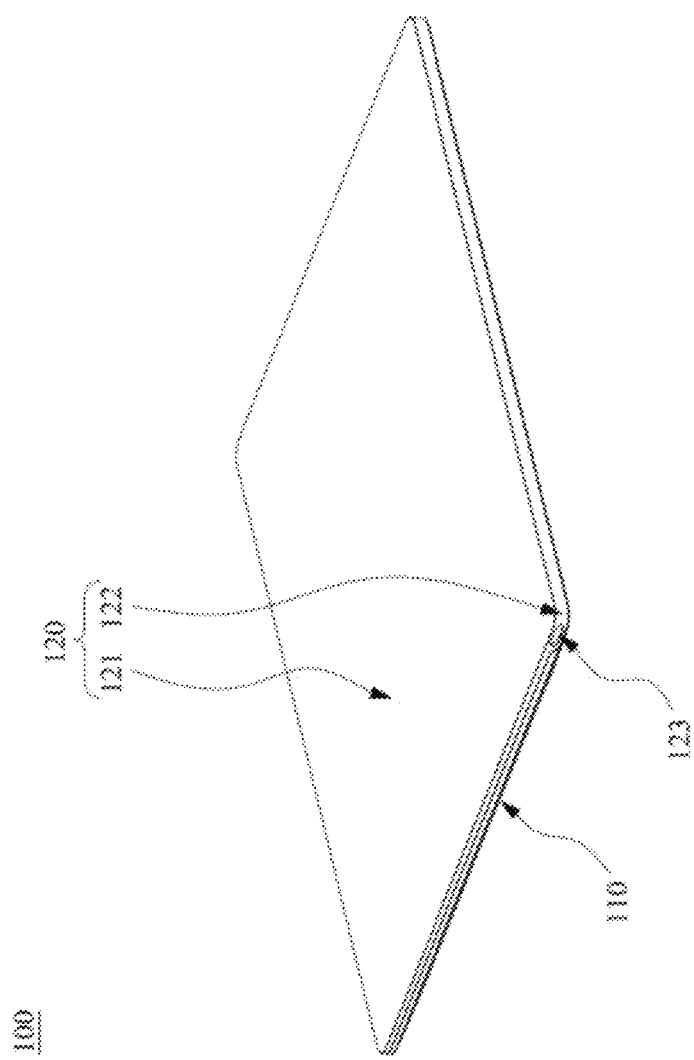
FIG. 1 is a perspective view of an electronic device with a second body structure closed relative to a first body structure in an embodiment.
Figure 2:
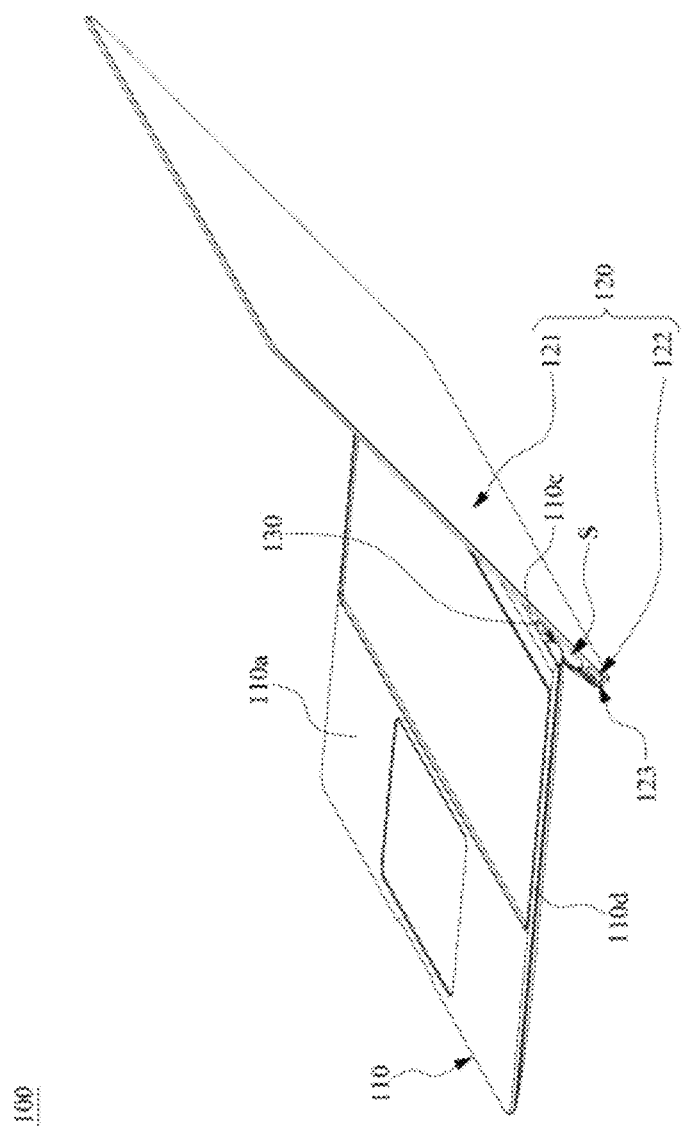
FIG. 2 is a perspective view of an electronic device with a second body structure opened relative to a first body structure in an embodiment.
Figure 3:
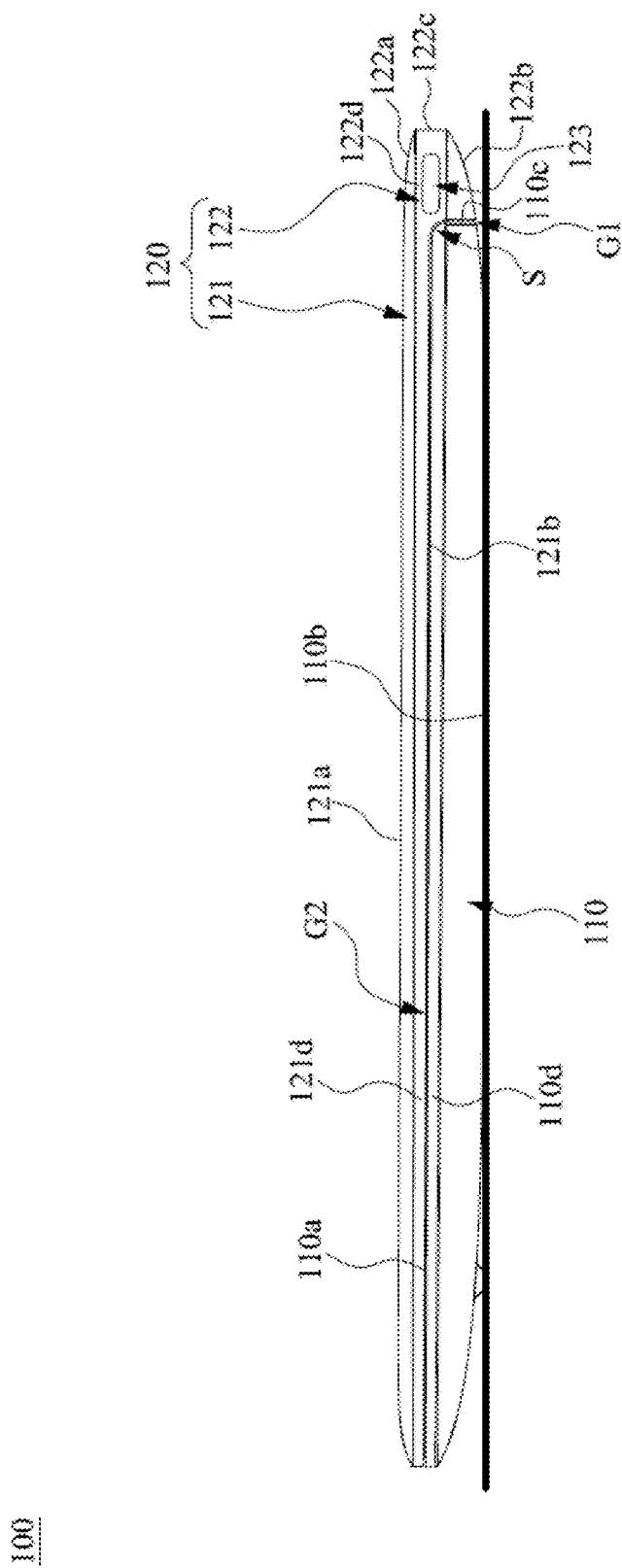
FIG. 3 is a side view of the electronic device in FIG. 1 in an embodiment.
Figure 4:
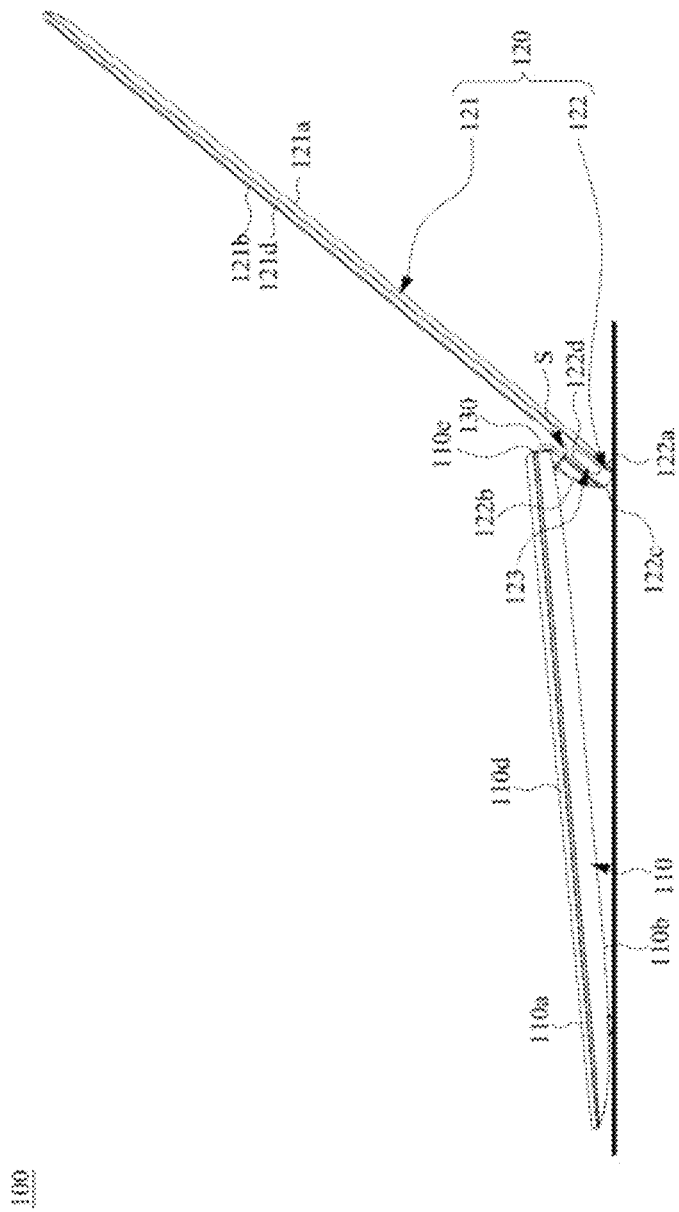
FIG. 4 is a side view of the electronic device in FIG. 2 in an embodiment.

Please refer to FIG. 1, FIG. 2, FIG. 3 and FIG. 4. FIG. 1 is a perspective view of an electronic device 100 with a second body structure 120 closed relative to a first body structure 110 in an embodiment. FIG. 2 is a perspective view of an electronic device 100 with a second body structure 120 opened relative to a first body structure 110 in an embodiment. FIG. 3 is a side view of the electronic device 100 in FIG. 1 in an embodiment. FIG. 4 is a side view of the electronic device 100 in FIG. 2 in an embodiment. The structures and functions of the components included in the electronic device 100 are described in detail hereinafter. The connection and operation relationships between the components are also described hereinafter.

As shown in FIG. 1 to FIG. 4, in an embodiment, the electronic device 100 includes a first body structure 110 and a second body structure 120. The second body structure 120 is connected to the first body structure 110. In the embodiment, the electronic device 100 is a notebook computer, which is not limited herein. The first body structure 110 is a host of the notebook computer. The second body structure 120 is a display screen of the notebook computer. The second body structure 120 includes a cover portion 121 and an end portion 122 at an edge of the cover portion 121. The thickness of the end portion 122 is larger than the thickness of the cover portion 121. In an embodiment, the minimum thickness of the end portion 122 is larger than the maximum thickness of the cover portion 121. In the embodiment, the minimum thickness of the end portion 122 is twice larger than the maximum thickness of the cover portion 121, which is not limited herein. An I/O port (input/output port) 123 is disposed at a side wall 122d of the end portion 122. When the cover portion 121 covers the top surface 110a of the first body structure 110, the end portion 122 covers a side wall 110c of the first body structure 110 (as shown in FIG. 3). Therefore, the first body structure 110 cannot be seen from the back of the electronic device 100. When the second body structure 120 rotates relative to the first body structure 110 to expose the rear side wall 110c of the first body structure 110, at least part of the end portion 122 is located below the bottom surface 110b of the first body structure 110 (as shown in FIG. 4).

In the embodiment, the end portion 122 of the second body structure 120 can cover the rear side wall 110c of first body structure 110. The I/O port 123 is configured at the side wall 122d of the end portion 122. The thickness of the first body structure 110 and the cover portion 121 of the second body structure 120 can be determined freely without consideration of the configuration of the I/O port 123. Thus, the first body structure 110 and the cover portion 121 of the second body structure 120 can be designed to be thinner. In the embodiment, when the first body structure 110 rotates to be opened relative to the second body structure 120, at least part of the end portion 122 is located below the bottom surface 110b of the first body structure 110 (as shown in FIG. 4). At the time, the end portion 122 serves as a support to raise the first body structure 110. Thus, the operation surface (that is, the top surface 110a) of the first body structure 110 has an ergonomic angle for the user to operate.

In the embodiment, the I/O port 123 disposed at the side wall 122d of the end portion 122 is a USB port, which is not limited herein. In an embodiment, any type of the I/O port (such as an audio source hole) with a proper size is disposed at the side wall 110d of the first body structure 110 or the side wall 121d of the cover portion 121.

As shown in FIG. 1 and FIG. 3, in the embodiment, the top surface 121a of the cover portion 121 and the top surface 122a of the end portion 122 are continuous. Therefore, the whole top surface of the second body structure 120 is smooth when viewed from the top of the electronic device 100, which makes the appearance of the electronic device 100 consistent.

Figure 5:
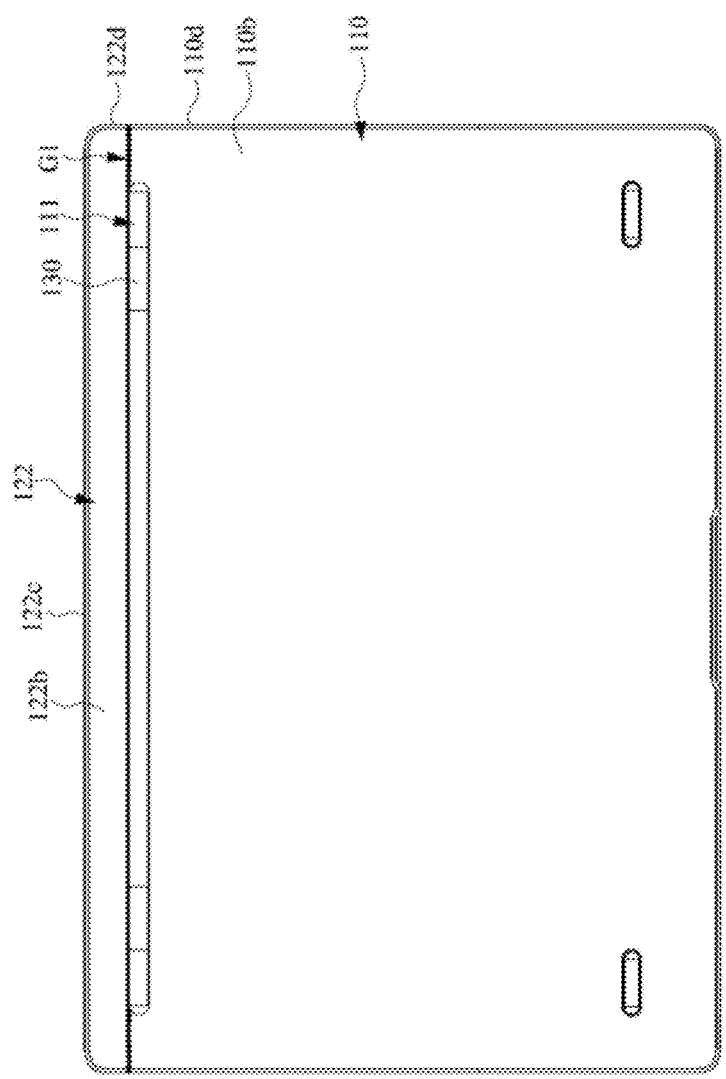
FIG. 5 is a bottom view of the electronic device in FIG. 1 in an embodiment.
Figure 6:
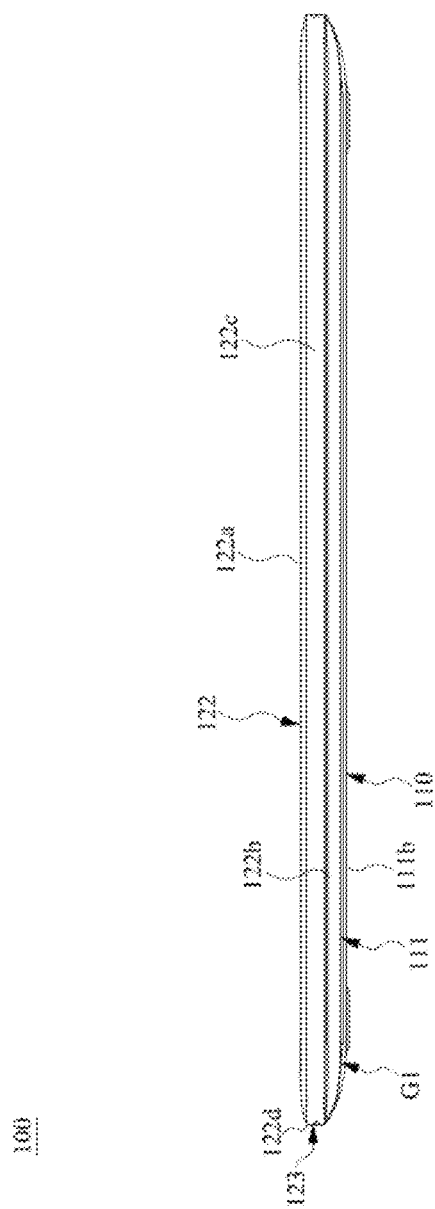
FIG. 6 is a rear view of the electronic device in FIG. 1 in an embodiment.

Please refer to FIG. 5 and FIG. 6. FIG. 5 is a bottom view of the electronic device 100 in FIG. 1 in an embodiment. FIG. 6 is a rear view of the electronic device 100 in FIG. 1 in an embodiment. As shown in FIG. 3, FIG. 5 and FIG. 6, in an embodiment, when the cover portion 121 covers the top surface 110a of the first body structure 110, a bottom gap G1 is formed between the bottom surface 110b of the first body structure 110 and the bottom surface 122b of the end portion 122. In an embodiment, the bottom gap G1 is slender. The bottom surface 110b of the first body structure 110 and the bottom surface 122b of the end portion 122 are located at two sides of the bottom gap G1, respectively. In an embodiment, the bottom gap G1 does not extend to a rear side wall 122c of the end portion 122. When the second body structure 120 covers the first body structure 110, the bottom gap G1 is located at the bottom of the electronic device 100 and does not extend to the rear side wall 122c of the end portion 122. The top surface (which includes the top surface 121a of the cover portion 121 and the top surface 122a of the end portion 122) of the second body structure 120 and the rear side wall (that is, the rear side wall 122c of the end portion) are smooth, which makes the appearance of the electronic device 100 simple and consistent. Since the bottom gap G1 is formed at the bottom of the electronic device 100, dust or liquid would not easily drop into the interior between the first body structure 110 and the second body structure 120 from the bottom gap G1. Therefore, the electronic device 100 is dustproof or waterproof.

As shown in FIG. 5, in an embodiment, the first body structure 110 and the second body structure 120 are connected via a connecting portion. In the embodiment, the connecting portion is a pivot 130. In an embodiment, the pivot 130 is a hinge. As shown in FIG. 5, the first body structure 110 includes a groove 111. The groove 111 is formed at the bottom surface 110b of the first body structure 110 and communicated to the bottom gap G1 to accommodate the pivot 130. When the second body structure 120 covers the first body structure 110, the pivot 130 is accommodated in the groove 111 at the bottom of the electronic device 100 and not exposed outside (as shown in FIG. 6). Therefore, the pivot 130 cannot be seen from the top or rear of the electronic device 100. Then, the appearance of the electronic device 100 looks better.

Figure 7:
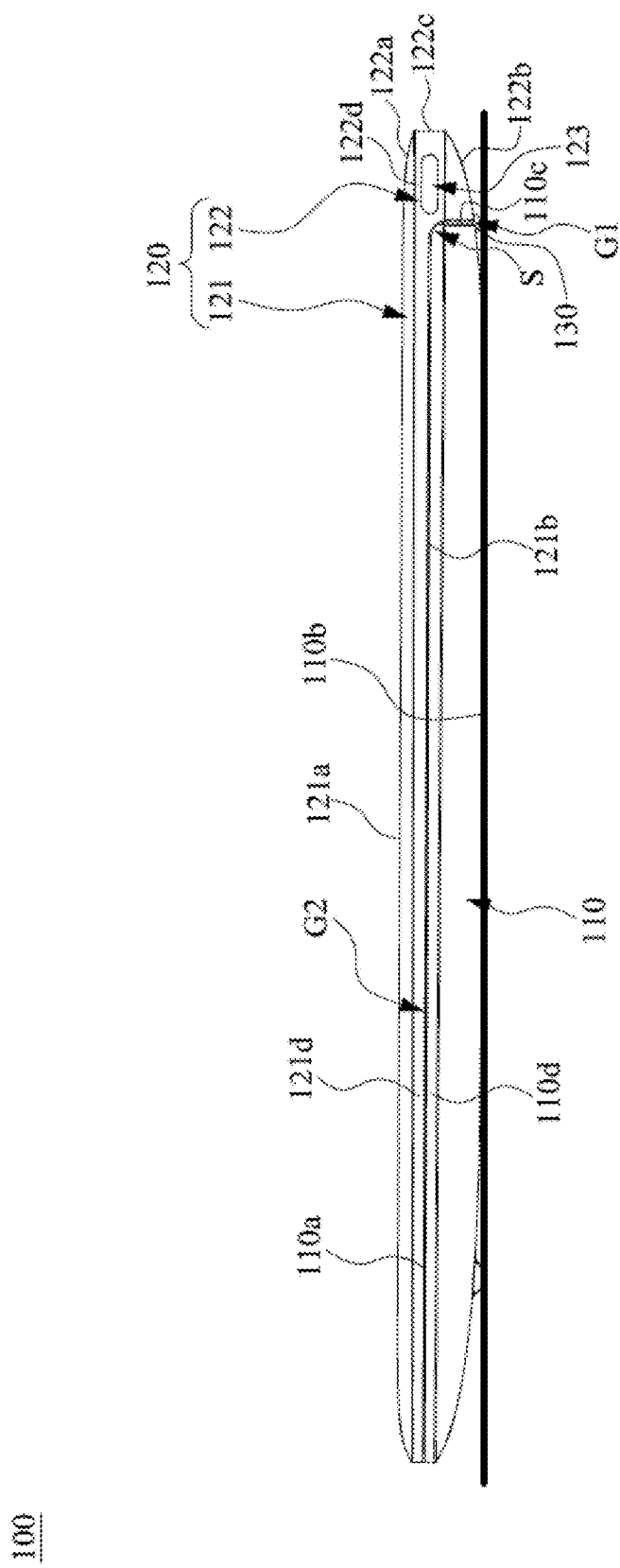
FIG. 7 is a side view of an electronic device in an embodiment.

In the embodiment, the pivot 130 is inserted in the end portion 122, which is not limited herein. Please refer to FIG. 2 and FIG. 7. FIG. 7 is a side view of an electronic device 100 in an embodiment. As shown in FIG. 7, in an embodiment, the pivot 130 is disposed directly at the bottom gap G1 between the bottom surface 110b of the first body structure 110 and the bottom surface 122b of the end portion 122. Thus, the first body structure 110 and the second body structure 120 are rotatable relative to the bottom gap G1, and the groove 111 of the embodiment in FIG. 5, is not omitted. In the embodiment, when the second body structure 120 covers the first body structure 110, the bottom of the electronic device 100 has a flat or flush appearance.

In the embodiments, the demarcation between the rear side wall 122c and the bottom surface 122b of the end portion 122 is clear (as shown in FIG. 3, FIG. 5 and FIG. 6) to distinguish the rear side wall 122c and the bottom surface 122b, which is not limited herein. In an embodiment, the demarcation between the rear side wall 122c and the bottom surface 122b of the end portion 122 is not clear (that is, the rear side wall 122c and the bottom surface 122b are continuous with a smooth transition). In this case, part of the end portion 122 that can be seen from the bottom of the electronic device 100 is defined as the bottom surface 122b of the end portion 122, and part of the end portion 122 that can be seen from the rear of the electronic device 100 is defined as the rear side wall 122c of the end portion 122. The bottom surface 122b and the rear side wall 122c of the end portion 122 as defined above are partially overlapped.

On the other hand, as shown in FIG. 3 and FIG. 4, the thickness of the end portion 122 is larger than the thickness of the cover portion 121, and then a thickness difference S between the cover portion 121 and the end portion 122 is formed. In the embodiment, when the end portion 122 covers the rear side wall 110c of the first body structure 110, the first body structure 110 matches the thickness difference S. Thus, the outlines of the first body structure 110 and the second body structure 120 are fully matched. In other words, when the end portion 122 covers the rear side wall 110c of the first body structure 110, the first body structure 110 fits the thickness difference S to flush the external surfaces of the first body structure 110 and the second body structure 120. Thus, the external surfaces of the first body structure 110 and the second body structure 120 seem to be smooth. In an embodiment, as shown in FIG. 1 and FIG. 3, when the cover portion 121 covers the top surface 110a of the first body structure 110, the side wall 110d of the first body structure 110 cuts flush with the side wall 121d of the cover portion 121. Thus, a side gap G2 is formed between the side wall 110d of the first body structure 110 and the side wall 121d of the cover portion 121.

Figure 8:
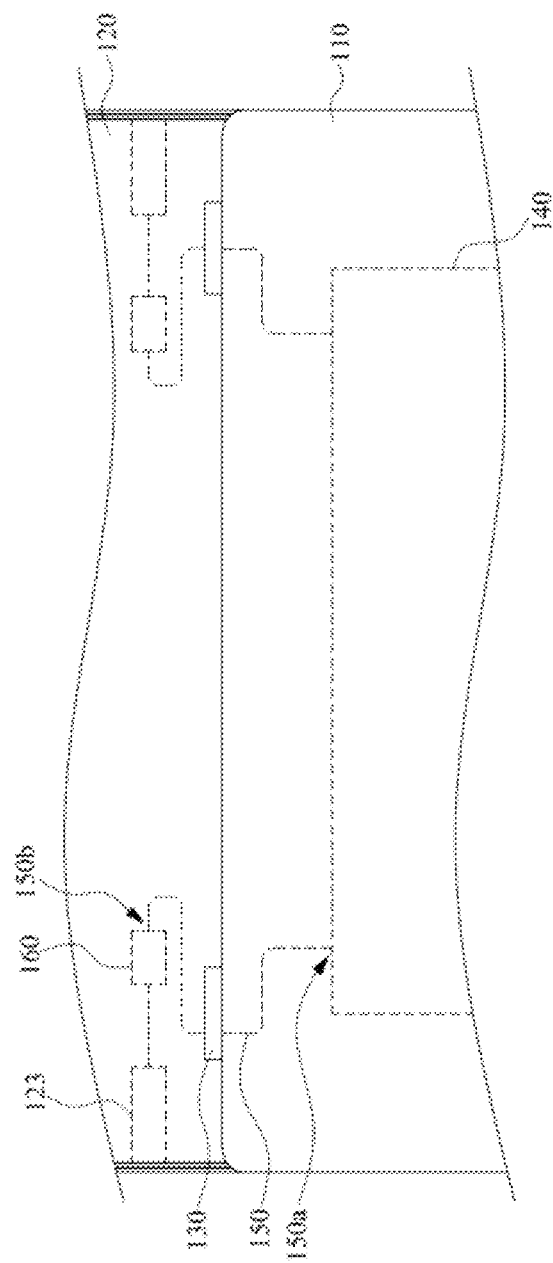
FIG. 8 is a partial top view of an electronic device in an embodiment.

Please refer to FIG. 8. FIG. 8 is a partial top view of an electronic device 100 in an embodiment. In FIG. 8, the second body structure 120 is opened relative to the first body structure 110. As shown in FIG. 8, in an embodiment, the electronic device 100 further includes a mainboard 140, a transmission line 150 and a circuit board 160. The mainboard 140 (which is represented by a dashed box) is disposed inside the first body structure 110. The transmission line 150 (which is represented by a dashed line) is disposed inside the electronic device 100. The transmission line 150 includes a first end 150a and a second end 150b. In the embodiment, the transmission line 150 passes through the connecting portion 130 to be electronically connected to the mainboard 140 via the first end 150a. The circuit board 160 is disposed inside the second body structure 120. The I/O port 123 is electronically connected to the second end 150b via the circuit board 160 (for example, the I/O port 123 is electronically connected to circuit board 160 via another transmission line, and the circuit board 160 is electronically connected to the second end 150b). Then, the I/O port 123 is electronically connected to mainboard 140 via the transmission line 150. In the embodiment, the I/O port 123 is a USB socket that conforms to the USB 3.0 standard. The circuit board 160 is configured to process high speed signals as specified by the USB 3.0 standard. In such a way, the high speed signals as specified by the USB 3.0 standard are transmitted between the I/O port 123 and the mainboard 140.

In an embodiment, the I/O port 123 is a USB socket that conforms to the USB 2.0 standard. The I/O port 123 is directly connected to the second end 150b of the transmission line 150. The circuit board 160 shown in FIG. 8 is omitted.

In the embodiments, the distance between two opposite side walls 110d of the first body structure 110 is equal to the distance between two opposite side walls 121d of the cover portion 121. Therefore, when the second body structure 120 is opened relative to the first body structure 110, the width of the operation surface of the first body structure 110 is the same as the width of the operation surface of the cover portion 121, which provides a visual consistency. Additionally, when the second body structure 120 covers the first body structure 110, the side walls of the second body structure 120 cut flush with the corresponding side walls of the first body structure 110, respectively, which makes the appearance of the electronic device 100 smooth.

In sum, the end portion of the second body structure can cover the rear side wall of first body structure. The I/O port is configured at the side wall of the end portion. Therefore, the thickness of the first body structure and the thickness of the cover portion of the second body structure (which can covers the first body structure) are not limited by the size of the I/O port. Thus, the first body structure and the cover portion of the second body structure can be designed to be thinner. In the embodiments, when the first body structure rotates to be opened relative to the second body structure, at least part of the end portion is located below the bottom surface of the first body structure. At the time, the end portion serves as a support to raise the first body structure. Thus, the operation surface of the first body structure has an ergonomic angle for the user to operate.

Although the disclosure has been disclosed with reference to certain embodiments thereof, the disclosure is not for limiting the scope. Persons having ordinary skill in the art may make various modifications and changes without departing from the scope of the disclosure. Therefore, the scope of the appended claims should not be limited to the description of the embodiments described above.

What is claimed is:

1. An electronic device comprising:
   a first body structure:
   a connecting portion: and
   a second body structure connected to the first body structure via the connecting portion, the second body structure includes:
      a cover portion; and
      an end portion connected to an edge of the cover portion, a thickness of the end portion is larger than the thickness of the cover portion, and an I/O port (input/output port) is disposed at a side wall of the end portion;
   wherein when the cover portion covers a top surface of the first body structure, the end portion covers a rear side wall of the first body structure, and when the second body structure rotates relative to the first body structure to expose the rear side wall of the first body structure, at least part of the end portion is located below a bottom surface of the first body structure.

2. The electronic device according to claim 1, wherein the connecting portion includes a pivot, the first body structure and the second body structure are connected to each other via the pivot, the first body structure includes a groove, and the groove is formed at the bottom surface of the first body structure to accommodate the pivot.

3. The electronic device according to claim 1, wherein the connecting portion includes a pivot, the first body structure and the second body structure are connected to each other via the pivot, and the pivot is disposed in a bottom gap between the bottom surface of the first body structure and the bottom surface of the end portion.

4. The electronic device according to claim 1, wherein when the cover portion covers the top surface of the first body structure, side walls of the first body structure cut flush with the cover portion.

5. The electronic device according to claim 1, wherein the top surface of the cover portion and the top surface of the end portion are continuous.

6. The electronic device according to claim 1, wherein a thickness difference is formed between the cover portion and the end portion, and when the end portion covers the rear side wall of the first body structure, the first body structure fits the thickness difference.

7. The electronic device according to claim 1, wherein the electronic device further includes:
   a mainboard disposed inside the first body structure; and
   a transmission line disposed inside the electronic device, the transmission line includes a first end and a second end, the transmission line is electronically connected to the mainboard via the first end, and the transmission line is electronically connected to the I/O port via the second end.

8. The electronic device according to claim 7, wherein the transmission line passes through the connecting portion to be electronically connected to the mainboard via the first end.

9. The electronic device according to claim 7, wherein the circuit board is disposed inside the second body structure, the I/O port is electronically connected to the second end of the transmission line via the circuit board.

* * * * *